United States Patent
Wang et al.

(10) Patent No.: US 11,342,554 B2
(45) Date of Patent: May 24, 2022

(54) ANODE, AND ELECTROCHEMICAL DEVICE AND ELECTRONIC DEVICE COMPRISING SAME

(71) Applicant: NINGDE AMPEREX TECHNOLOGY LIMITED, Ningde (CN)

(72) Inventors: Bin Wang, Ningde (CN); Qian Wen, Ningde (CN); Yibo Zhang, Ningde (CN); Qiaoshu Hu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 335 days.

(21) Appl. No.: 16/676,668

(22) Filed: Nov. 7, 2019

(65) Prior Publication Data

US 2020/0313174 A1    Oct. 1, 2020

(30) Foreign Application Priority Data

Mar. 25, 2019  (CN) .......................... 201910227266.2

(51) Int. Cl.
*H01M 4/36* (2006.01)
*H01M 4/38* (2006.01)
(Continued)

(52) U.S. Cl.
CPC ............. *H01M 4/366* (2013.01); *H01M 4/38* (2013.01); *H01M 4/587* (2013.01); *H01M 4/602* (2013.01);
(Continued)

(58) Field of Classification Search
None
See application file for complete search history.

(56) References Cited

FOREIGN PATENT DOCUMENTS

| CN | 101159324 A | 4/2008 |
| CN | 105185927 A | 12/2015 |

(Continued)

OTHER PUBLICATIONS

Machine Translation of Chinese Patent Publication No. CN106207191 (Year: 2016).*

(Continued)

*Primary Examiner* — Wyatt P McConnell
(74) *Attorney, Agent, or Firm* — Juan Carlos A. Marquez; Marquez IP Law Office, PLLC

(57) ABSTRACT

The present application relates to an anode, and an electrochemical device and an electronic device comprising the same. Embodiments of the present application provided an anode comprising: a current collector, a first anode structure layer and a second anode structure layer. The first anode structure layer comprises a first framework material and the second anode structure layer comprises a second framework material, wherein the first anode structure layer is disposed between the current collector and the second anode structure layer, and the first framework material has a higher oxidation-reduction potential for lithium ion or electronic conductivity than the second framework material. When the anode with double-layer structure provided by the present application is charged, the space utilization ratio of the anode can be enhanced, the rate capability of the electrochemical device can be enhanced, the formation of lithium dendrites may be inhibited, and the volume change amount of the anode can be reduced, thereby enhancing the safety performance and cycle performance of the electrochemical device.

17 Claims, 3 Drawing Sheets

(51) Int. Cl.
  *H01M 4/587* (2010.01)
  *H01M 4/60* (2006.01)
  *H01M 10/0525* (2010.01)
  *H01M 4/02* (2006.01)

(52) U.S. Cl.
  CPC .. *H01M 10/0525* (2013.01); *H01M 2004/021* (2013.01); *H01M 2004/027* (2013.01)

(56) References Cited

FOREIGN PATENT DOCUMENTS

| CN | 204947011 U | 1/2016 |
|----|-------------|--------|
| CN | 105789559 A | 7/2016 |
| CN | 105845891 A | 8/2016 |
| CN | 106207191 A | 12/2016 |
| CN | 107221709 A | 9/2017 |
| CN | 107732170 A | 2/2018 |
| CN | 108140786 A | 6/2018 |
| CN | 108448063 A | 8/2018 |
| CN | 108448115 A | 8/2018 |
| CN | 108539252 A | 9/2018 |
| CN | 108598490 A | 9/2018 |
| CN | 108878748 A | 11/2018 |
| CN | 109994739 A | 7/2019 |
| WO | 2018164640 A1 | 9/2018 |

OTHER PUBLICATIONS

PCT International Search Report, dated Mar. 6, 2020, in counterpart PCT application PCT/CN2019/122694, 5 pages.
PCT Written Opinion, dated Mar. 6, 2020, in counterpart PCT application PCT/CN2019/122694, 5 pages.
Chinese First Office Action, dated May 8, 2020, in counterppart Chinese application 201910227266.2, 7 pages in Chinese.
"Coralloid Carbon Fiber-Based Composite Lithium Anode for Robust Lithium," Rui Zhang et al., Joule 2, pp. 1-14, Apr. 18, 2018.
"Free-standing Copper Nanowire Network Current Collector for Improving Lithium Anode Performance," Lei-Lei Lu et al., American Chemical Society Nano Letters, pp. 1-20, Jun. 2, 2016.
"Selective deposition and stable encapsulation of lithium through heterogeneous seeded growth," Kai Yan et al., Nature Energy, vol. 1, pp. 1-8, Mar. 2016.
"Composite lithium metal anode by melt infusion of lithium into a 3D conducting scaffold with lithiophilic coating," Zheng Liang et al., Proceedings of the U.S. National Academy of Sciences PNAS Early Edition, 2016.
Chinese Third Office Action, dated Feb. 9, 2021, in counterppart Chinese application 201910227266.2, 6 pages in Chinese.

* cited by examiner

ANODE, AND ELECTROCHEMICAL DEVICE AND ELECTRONIC DEVICE COMPRISING SAME

CROSS REFERENCE TO RELATED APPLICATIONS

The present application claims the benefit of priority from the China Patent Application No. 201910227266.2, filed on 25 Mar. 2019, the disclosure of which is hereby incorporated by reference in its entirety.

BACKGROUND

1. Field of the Invention

The present application relates to the field of energy storage technologies, and in particular, to an anode and an electrochemical device comprising the same.

2. Description of the Related Art

Electrochemical devices (for example, lithium-ion batteries) have entered our daily lives with advancements in technology and environmental protection requirements. In order to meet performance requirements of the electronic device with high energy consumption for the electrochemical device, the energy density of the electrochemical device is ever increasing, and the attendant safety risk is becoming ever more prominent. Therefore, it is particularly important to investigate electrochemical devices with good safety performance.

In order to enhance the energy density and operating voltage of lithium-ion batteries, one of the feasible research solutions is using lithium metal as the anode. However, the use of lithium metal as the anode may cause various problems during the cycle of charging and discharging, such as side reaction with the electrolytic solution, formation of lithium dendrites, and increase in the volume change rate of the anode, thereby deteriorating the safety and cycling performances of the lithium-ion battery. Therefore, it is still necessary to further improve the structure of the anode to obtain an anode with high ionic conductivity and good structural stability.

SUMMARY

In view of the problems in the prior art, an objective of the present application is to provide an anode, and an electrochemical device and an electronic device comprising the same in an attempt to solve at least one of the problems existing in the related art at least to some extent.

Some embodiments of the present application provide an anode, including: a current collector, a first anode structure layer and a second anode structure layer. The first anode structure layer comprises a first framework material and the second anode structure layer comprises a second framework material, wherein the first anode structure layer is arranged between the current collector and the second anode structure layer, and the first framework material has a higher oxidation-reduction potential for lithium ion or electronic conductivity than the second framework material.

According to some embodiments, the first framework material has an oxidation-reduction potential for lithium ion of about −50 mV to about 250 mV, and the second framework material has an oxidation-reduction potential for lithium ion of about −100 mV to about 200 mV.

According to some embodiments, the first framework material has an electronic conductivity of about $1\times10^{-2}$ S/m to about $6.30\times10^{7}$ S/m, and the second framework material has an electronic conductivity of about $1\times10^{-25}$ S/m to about $5.95\times10^{7}$ S/m.

According to some embodiments, the anode further includes at least one third anode structure layer, the third anode structure layer comprising a third framework material, wherein the second anode structure layer is arranged between the first anode structure layer and the third anode structure layer, and the second framework material has a higher lithium ion oxidation-reduction potential or electronic conductivity than the third framework material.

According to some embodiments, the anode includes a plurality of the third anode structure layers, wherein the third framework material comprised in any one of the plurality of the third anode structure layers has a higher lithium ion oxidation-reduction potential or electronic conductivity than the third framework material comprised in the other third anode structure layers farther from the current collector.

According to some embodiments, the first framework material, the second framework material and the third framework material are each independently selected from the group consisting of a high molecular polymer, a carbon-based material, a metal material, a solid electrolyte material, a composite material and combinations thereof.

According to some embodiments, the high molecular polymer is selected from the group consisting of polyethylene oxide, polyimide, polyacrylic acid, polyethylene, polypropylene, polyacrylonitrile, polystyrene, polyvinyl fluoride, polyetheretherketone, polyester, polyvinylidene chloride, polytetrafluoroethylene, polyethylene terephthalate, derivatives thereof, and combinations thereof.

According to some embodiments, the carbon-based material is selected from the group consisting of porous carbon, carbon nanotubes, carbon fibers, graphene, hollow carbon spheres and combinations thereof.

According to some embodiments, the metal material is selected from the group consisting of copper, silver, gold, nickel and alloys thereof.

According to some embodiments, the solid electrolyte material is selected from the group consisting of lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al,Ga)_x(Ti,Ge)_{2-x}Si_yP_{3-y}O_{12}$, wherein $0\leq x\leq 1$ and $0\leq y\leq 1$, lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$, $0<y<2$), $SiS_2$ glass ($Li_xSi_yS_z$, wherein $0\leq x<3$, $0<y<2$, and $0<z<4$), $P_2S_5$ glass ($Li_xP_yS_z$, wherein $0<x<3$, $0<y<3$, and $0<z<7$), $Li_2O$, LiF, LiOH, $Li_2CO_3$, $LiAlO_2$, $Li_2O-Al_2O_3-SiO_2-P_2O_5-TiO_2-GeO_2$ ceramic, garnet ceramic ($Li_{3+x}La_3M_2O_{12}$, wherein $0\leq x\leq 5$, and M is Te, Nb or Zr) and combinations thereof.

According to some embodiments, the composite material comprises a framework material selected from the group consisting of a high molecular polymer, a carbon-based material, a metal material, a solid electrolyte material and combinations thereof, and the inner and outer surfaces of the framework material are covered by another material selected from the group consisting of a high molecular polymer, a carbon-based material, a metal material, a solid electrolyte material, an insulating material and combinations thereof, wherein the insulating material is selected from the group consisting of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$ and combinations thereof.

According to some embodiments, the first anode structure layer has a porosity of about 30% to about 98%, and the second anode structure layer has a porosity of about 30% to about 98%.

According to some embodiments, the first anode structure layer and the second anode structure layer have a thickness of about 0.1 μm to about 1 mm, and the anode has a total thickness of about 0.1 μm to about 2 mm.

In some embodiments, the present application provides an electrochemical device, including: a cathode, a separator and the anode in the above embodiments.

In some embodiments, the present application provides an electronic device, comprising the electrochemical device in the above embodiments.

BRIEF DESCRIPTION OF THE DRAWINGS

The following will briefly illustrate the accompanying drawings necessary to describe the embodiments of the present application or the prior art so as to facilitate the description of the embodiments of the present application. The accompanying drawings described below are only part of the embodiments of the present application.

DETAILED DESCRIPTION OF EMBODIMENTS

Figure 1A:
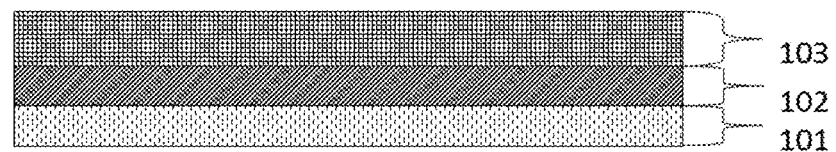
FIG. 1A is a side view showing the structure of a single-sided anode according to some embodiments of the present application.

In order to make the objects, technical solutions and advantages of the present application more clear, the technical solutions of the present application will be clearly and completely described in the following with reference to the embodiments of the present application. It is apparent that the described embodiments are a part of the embodiments of the present application, rather than all of the embodiments. All other embodiments obtained by those skilled in the art based on the technical solutions and embodiments provided by the present application and without the creative work are all within the scope of the present application.

In this specification, unless otherwise specified or limited, the relative terms such as "central", "longitudinal", "lateral", "front", "rear", "right", "left", "internal", "external", "lower", "higher", "horizontal", "vertical", "higher than", "lower than", "above", "below", "top" and "bottom", and their derivatives (e.g. "horizontally", "downward", "upward") should be interpreted as referring to the directions described in the discussion or in the drawings. These relative terms are used for convenience only in the description and are not required to construct or operate the present application in a particular direction.

Further, for convenience of description, "first", "second", "third" and the like may be used herein to distinguish different components of one drawing or series of drawings. "First", "second", "third" and the like are not intended to describe the corresponding components.

In addition, amounts, ratios and other numerical values are sometimes presented herein in a range format. It should be understood that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

In the detailed description and the claims of the present application, the terms "substantially", "generally", "essentially" and "about" are used to describe and explain small variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios and other numerical values are sometimes presented herein in a range format. It should be appreciated that such range formats are for convenience and conciseness, and should be flexibly understood as comprising not only values explicitly specified to range constraints, but also all individual values or sub-ranges within the ranges, like explicitly specifying each value and each sub-range.

In the detailed description and claims of the present application, the term "framework material" is defined as a material having a three-dimensional structure and having pores in the interior of the three-dimensional structure, which may be a conventional choice in the art.

In an electrochemical device (for example, a lithium-ion battery), lithium metal used as an anode of the electrochemical device can increase the energy density of the battery and the operating voltage of the battery. However, with the charge and discharge cycle of the electrochemical device, the use of lithium metal as the anode may cause various problems including: side reaction with the electrolytic solution, formation of lithium dendrites, and increase in the volume change rate of the anode. Among the problems, the increase in the volume change rate of the anode in may cause the interfacial area between the anode and other adjacent structures to be easily peeled off, so that the impedance is drastically increased, and in severe cases, the deformation of the electrochemical device may also occur.

The present application provides an anode having a multilayer structure. The anode has two or more layers. By using different material compositions and framework material structure designs for each layer, the layer closer to the current collector has a higher lithium ion oxidation-reduction potential or electronic conductivity.

The structure of the anode of the embodiments of the present application and the advantageous effects of the structure will be described below with reference to FIGS. 1A-1C.

The anode of the present application may be a single-sided structure or a double-sided structure. FIG. 1A is a side view showing the structure of a single-sided anode according to some embodiments of the present application.

As shown in FIG. 1A, the anode of the present application includes: a current collector 101, a first anode structure layer 102 and a second anode structure layer 103, wherein the first anode structure layer 102 is arranged between the current collector 101 and the second anode structure layer 103. The first anode structure layer 102 comprises a first framework material, the second anode structure layer 103 comprises a second framework material, and the first framework material has a higher lithium ion oxidation-reduction potential or electronic conductivity than the second framework material. The pores existing in the first framework material and the second framework material reserve a space for deposition of lithium metal, and therefore, the volume change rate of the anode during the charge and discharge cycle is reduced, thereby improving problems of interface peeling, cell deformation and the like.

Further, by designing the first framework material to have a higher lithium ion oxidation-reduction potential or electronic conductivity than the second framework material, the lithium metal can be preferentially deposited in the first anode structure layer 102 adjacent to the current collector 101, thereby preventing the lithium metal from being preferentially deposited in the second anode structure layer 103 away from the current collector 101 and blocking the lower portion thereof, causing the lithium metal to fail to fill the entire anode, and further reducing the rate of the anode in volume change during the charge and discharge cycle. The anode of the present application can significantly enhance space utilization ratio and optimize the rate capability of the electrochemical device. In addition, the structure of the anode may also homogenize and densify lithium metal deposition, thereby reducing side reactions between the lithium metal and the electrolyte and formation of lithium dendrites, and improving the energy density and cycle life of the lithium metal battery.

In some embodiments, the first framework material has a lithium ion oxidation-reduction potential of about −50 mV to about 250 mV, and the second framework material has a lithium ion oxidation-reduction potential of about −100 mV to about 200 mV.

In some embodiments, the first framework material has an electronic conductivity of about $1\times10^{-2}$ S/m to about $6.30\times10^{7}$ S/m, and the second framework material has an electronic conductivity of about $1\times10^{-25}$ S/m to about $5.95\times10^{7}$ S/m.

In some embodiments, the first anode structure layer 102 and the second anode structure layer 103 each have a porosity of about 30% to about 98%. If the porosity of each of the first anode structure layer 102 and the second anode structure layer 103 is too low, the volumetric energy density of the electrochemical device thereof will be too low. If the porosity is too high, the anode will have an unstable structure and be easy to collapse during the preparation process or the cycle process.

In some embodiments, the first anode structure layer 102 and the second anode structure layer 103 have a thickness of about 0.1 μm to about 1 mm, and the anode has a total thickness of about 0.1 μm to about 2 mm.

Figure 1B:
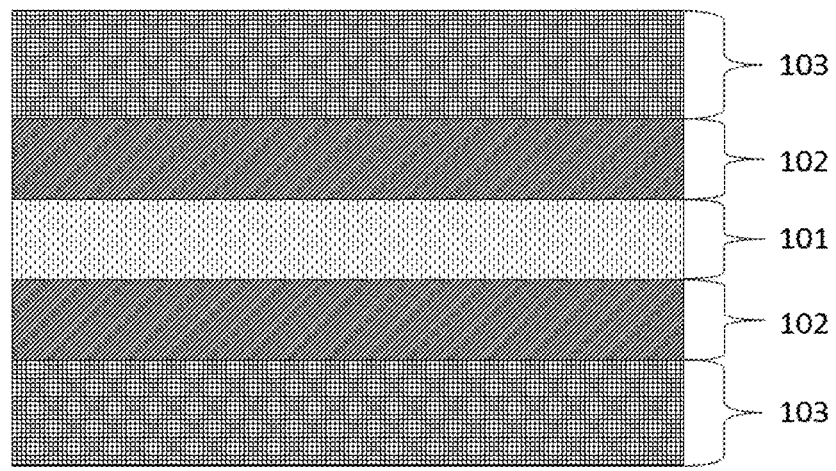
FIG. 1B is a side view showing the structure of a double-sided anode according to some embodiments of the present application.

FIG. 1B is a side view showing the structure of a double-sided anode according to some embodiments of the present application.

As shown in FIG. 1B, the first anode structure layer 102 and the second anode structure layer 103 are arranged on both side surfaces of the current collector 101, wherein the first anode structure layer 102 is located between the current collector 101 and the second anode structure layer 103.

Figure 1C:
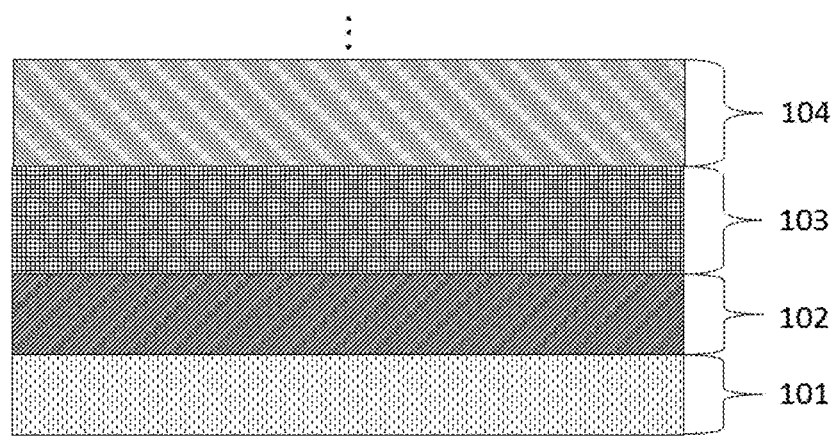
FIG. 1C is a side view showing the structure of a multilayer structure anode according to some embodiments of the present application.

FIG. 1C is a side view showing the structure of a multilayer structure anode according to some embodiments of the present application.

In some embodiments, the anode of the present application further includes at least one third anode structure layer 104. As shown in FIG. 1C, the third anode structure layer 104 comprises a third framework material, wherein the second anode structure layer 103 is arranged between the first anode structure layer 102 and the third anode structure layer 104, and the second framework material has a higher lithium ion oxidation-reduction potential or electronic conductivity than the third framework material.

In some embodiments, the third anode structure layer 104 has a thickness of about 0.1 μm to about 1 mm.

It should be understood that although FIG. 1C only illustrates the single-layer third anode structure layer 103, FIG. 1C is merely an exemplary embodiment illustrating the multilayer structure of the anode of the present application. Those skilled in the art can adjust the number of layers of the anode structure layer in the anode according to the specific needs of the present disclosure without being limited thereto.

In some embodiments, the anode of the present application may further comprises a plurality of the third anode structure layers 104, wherein the third framework material comprised in any one of the plurality of the third anode structure layers 104 has a higher lithium ion oxidation-reduction potential or electronic conductivity than the third framework material comprised in the other third anode structure layers farther from the current collector. For example, the difference of the oxidation-reduction potential of the anode structure layer in the anode closer to the current collector minus the oxidation-reduction potential of the farther anode structure layer is greater than 0 mV, or the anode structure layer in the anode closer to the current collector has a higher electronic conductivity. The inside of the anode using the multilayer structure of the present application may be completely filled with lithium metal, thereby avoiding waste of space, further maximizing the energy density of the anode, and enhancing the energy density of the anode by 10% or more.

In some embodiments, the first anode structure layer 102, the second anode structure layer 103 and the third anode structure layer 104 have a pore size of about 0.1 mm to about 10 mm and a pore density of about 5 ppi to about 30 ppi.

According to the embodiments of the present application, the current collector 101 may be any anode current collector commonly used in the art, including, but not limited to, tin foil, copper foil, lithium foil and lithium-clad copper foil.

According to the embodiments of the present application, the first framework material, the second framework material and the third framework material are each independently selected from the group consisting of a high molecular polymer, a carbon-based material, a metal material, a solid electrolyte material, a composite material and combinations thereof.

In some embodiments, the high molecular polymer is selected from the group consisting of polyethylene oxide, polyimide, polyacrylic acid, polyethylene, polypropylene, polyacrylonitrile, polystyrene, polyvinyl fluoride, polyetheretherketone, polyester, polyvinylidene chloride, polytetrafluoroethylene, polyethylene terephthalate, derivatives thereof, and combinations thereof;

In some embodiments, the carbon-based material is selected from the group consisting of porous carbon, carbon nanotubes, carbon fibers, graphene, hollow carbon spheres and combinations thereof;

In some embodiments, the metal material is selected from the group consisting of copper, silver, gold, nickel and alloys thereof.

In some embodiments, the solid electrolyte material is selected from the group consisting of lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al,Ga)_x(Ti,Ge)_{2-x}Si_yP_{3-y}O_{12}$, wherein $0\leq x\leq 1$ and $0\leq y\leq 1$, lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$, $0<y<2$), $SiS_2$ glass ($Li_xSi_yS_z$, wherein $0\leq x<3$, $0<y<2$, and $0<z<4$), $P_2S_5$ glass ($Li_xP_yS_z$, wherein $0\leq x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramic, garnet ceramic ($Li_{3+x}La_3M_2O_{12}$, wherein $0\leq x\leq 5$, and M is Te, Nb or Zr) and combinations thereof.

In some embodiments, the composite material comprises a framework material selected from the group consisting of a high molecular polymer, a carbon-based material, a metal material, a solid electrolyte material and combinations thereof, and the inner and outer surfaces of the framework material are covered by another material selected from the group consisting of a high molecular polymer, a carbon-based material, a metal material, a solid electrolyte material, an insulating material and combinations thereof, wherein the insulating material is selected from the group consisting of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$ and combinations thereof.

In some embodiments, the preparation method of the composite material may be a preparation method commonly used in the art, including, but not limited to, atomic layer deposition (ALD) and electrochemical deposition.

The preparation method of an anode provided by the present application will be described below with reference to FIG. 2.

Figure 2:
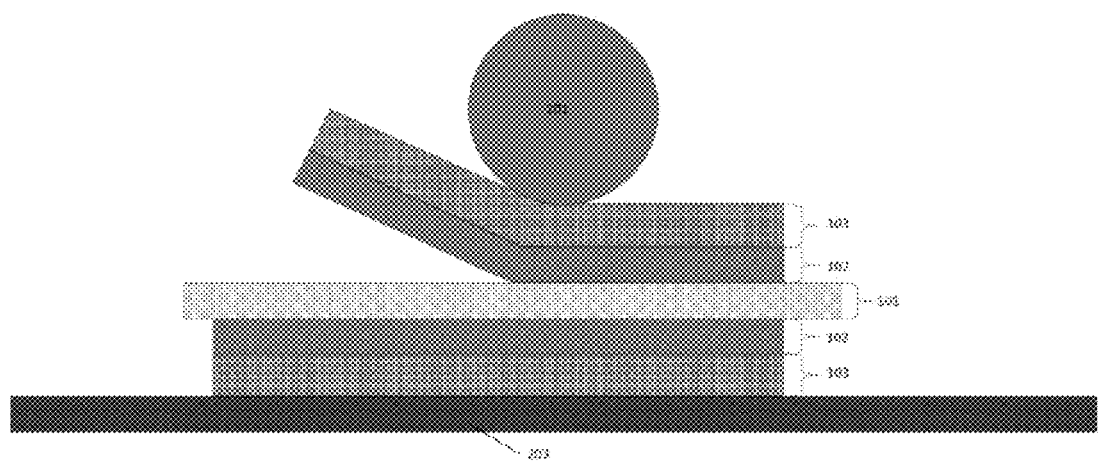
FIG. 2 is a schematic diagram of a preparation method of an anode according to some embodiments of the present application.

As shown in FIG. 2, the preparation method of the anode includes: the first anode structure layer 102 and the second anode structure layer 103 are sequentially stacked to form a multilayer structure and placed on the surface of the current collector 101, and the multilayer structure is pressed against the current collector 101 by using a roller 201 by means of rolling.

It should be understood that the preparation method of the anode of the present application may be a conventional electrode plate preparation method in the art. Those skilled in the art, through the content of the specification or the claims, may select any preparation method in the art according to specific needs without being limited thereto.

Some embodiments of the present application provide an electrochemical device, including a cathode, a separator and the anode of the above embodiments. In some embodiments, the electrochemical device is a lithium-ion battery, and a lithium-ion battery will be used as an example below to illustrate the composition and preparation method of the electrochemical device of the present application.

According to some embodiments of the present application, the cathode comprises a cathode current collector and a cathode active material layer on a surface thereof, wherein the cathode active material layer comprises a cathode active material and a conductive agent. In some embodiments, the cathode current collector includes, but not limited to, aluminum foil or nickel foil.

In some embodiments, examples of the cathode active material may include at least one of lithium cobaltate, lithium iron phosphate, lithium manganese iron phosphate, sodium iron phosphate, lithium vanadium phosphate, sodium vanadium phosphate, oxylithium vanadium phosphate, oxysodium vanadium phosphate, lithium vanadate, lithium manganate, lithium nickelate, lithium nickel cobalt manganese oxide, lithium-rich manganese-based material, lithium nickel cobalt aluminum oxide and lithium titanate.

In the above cathode active material, the chemical formula of the lithium cobaltate may be $Li_aCo_bM_1cO_{2-d}$, wherein $M_1$ is at least one of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr) and silicon (Si), and the values of a, b, c and d are respectively in the following ranges: $0.8\leq a\leq 1.2$, $0.8\leq b\leq 1$, $0\leq c\leq 0.2$, and $-0.1\leq d\leq 0.2$;

In the above cathode active material, the chemical formula of the lithium nickelate may be $Li_eNi_fM_{2g}O_{2-h}$, wherein $M_2$ is at least one of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) and silicon (Si), and the values of e, f, g and h are respectively in the following ranges: $0.8\leq e\leq 1.2$, $0.3\leq f\leq 0.98$, $0.02\leq g\leq 0.7$, and $-0.1\leq h\leq 0.2$;

In the above cathode active material, the chemical formula of the lithium manganate may be $Li_iMn_{2-j}M_{3j}O_{4-k}$, wherein $M_3$ is at least one of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of j and k are respectively in the following ranges: $0.8\leq i\leq 1.2$, $0\leq j<1.0$ and $-0.2\leq k\leq 0.2$.

In the above cathode active material, the chemical formula of the lithium nickel cobalt manganese oxide may be $LiNi_lCo_mMn_nO_2$, wherein the values of l, m and n are respectively in the following ranges: $0<l<1.0$, $0<m<1.0$ and $0<n<1.0$, and $l+m+n=1$.

In some embodiments, the conductive agent includes at least one of conductive carbon black, carbon fibers, acetylene black, Ketjen black, graphene and carbon nanotubes. It will be understood by those skilled in the art that various cathodes widely used in the lithium-ion batteries are suitable for use in the present application without being limited thereto.

The separator in some embodiments of the present application includes, but not limited to, at least one selected from the group consisting of polyethylene, polypropylene, polyethylene terephthalate, polyimide and aramid. For example, the polyethylene includes at least one component selected from the group consisting of high-density polyethylene, low-density polyethylene and ultra-high molecular weight polyethylene. In particular, the polyethylene and polypropylene, which have a good effect on preventing short circuits, can improve the stability of the battery by the shutdown effect. Those skilled in the art will appreciate that various separators widely used in the lithium-ion batteries are suitable for use in the present application.

According to some embodiments of the present application, the above lithium-ion battery further includes an electrolyte, the electrolyte may be one of a gel electrolyte or an electrolytic solution, and the electrolytic solution includes a lithium salt and a non-aqueous solvent.

In some embodiments, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. For example, the lithium salt is $LiPF_6$ because $LiPF_6$ can give a high ionic conductivity and improve the cycle performance.

In some embodiments, the non-aqueous solvent may be a carbonate compound, a carboxylate compound, an ether compound, other organic solvents or a combination thereof.

In some embodiments, the carbonate compound may be a chain carbonate compound, a cyclic carbonate compound, a fluorocarbonate compound or a combination thereof.

In some embodiments, examples of the chain carbonate compound are diethyl carbonate, dimethyl carbonate, dipropyl carbonate, methyl propyl carbonate, ethyl propyl carbonate, ethyl methyl carbonate and combinations thereof. Examples of the cyclic carbonate compound are ethylene carbonate, propylene carbonate, butylene carbonate, vinyl ethylene carbonate, propyl propionate and combinations thereof. Examples of the fluorocarbonate compound are fluoroethylene carbonate, 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate and combinations thereof.

In some embodiments, examples of the carboxylate compound are methyl acetate, ethyl acetate, n-propyl acetate, t-butyl acetate, methyl propionate, ethyl propionate, γ-butyrolactone, decalactone, valerolactone, mevalonolactone, caprolactone, methyl formate and combinations thereof.

In some embodiments, examples of the ether compound are dibutyl ether, tetraethylene glycol dimethyl ether, diglyme, 1,2-dimethoxyethane, 1,2-diethoxyethane, ethoxymethoxyethane, 2-methyltetrahydrofuran, tetrahydrofuran and combinations thereof.

In some embodiments, examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate and combinations thereof.

Figure 3:
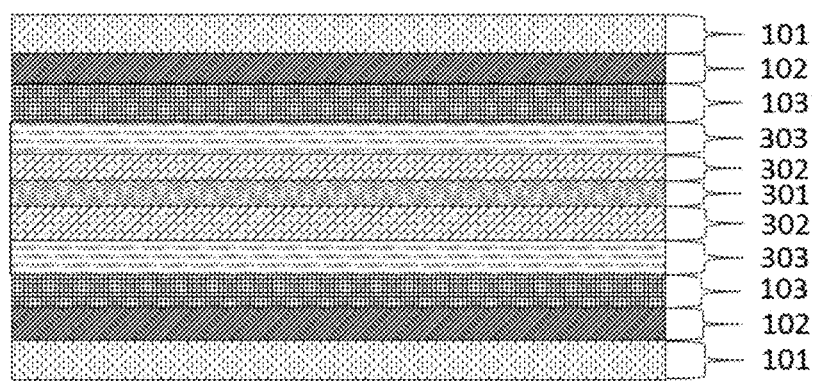
FIG. 3 is a side view showing the structure of an electrode assembly according to some embodiments of the present application.

The structure and preparation method of the electrode assembly in some embodiments of the present application are described below in conjunction with FIG. 3. FIG. 3 is a side view showing the structure of an electrode assembly according to some embodiments of the present application. As shown in FIG. 3, the electrode assembly comprises two sets of current collectors 101, first anode structure layers 102, second anode structure layers 103, separators 303, cathode active material layers 302 and cathode current collectors 301 sequentially arranged in opposite.

Some embodiments of the present application provide a preparation method of a lithium-ion battery, including: the cathode, the separator and the anode of the present application are sequentially wound or stacked into an electrode assembly, and then loaded into, for example, an aluminum plastic film, the electrolytic solution is injected, and formation and packaging are performed to prepare the lithium-ion battery.

Those skilled in the art will appreciate that the structure of the electrode assembly described above and the preparation method of the lithium-ion battery are merely exemplary embodiments. Other methods commonly used in the art can be employed as a preparation method of a lithium-ion battery without departing from the disclosure of the present application.

Those skilled in the art will appreciate that while the above is illustrated with a lithium-ion battery, the electrochemical device of the present application further includes any other suitable electrochemical device. The electrochemical device in the embodiments of the present application includes any device that generates an electrochemical reaction without departing from the disclosure of the present application, and the specific examples of the device include all kinds of primary batteries, secondary batteries, solar cells or capacitors. In particular, the electrochemical device is a lithium secondary battery, including a lithium metal secondary battery, a lithium ion secondary battery, a lithium polymer secondary battery, or a lithium ion polymer secondary battery.

The use of the electrochemical device of the present application is not particularly limited and can be used for any use known in the prior art. According to some embodiments of the present application, the electronic device comprising the electrochemical device of the present application includes, but not limited to, a notebook computer, a pen input computer, a mobile computer, an e-book player, a portable phone, a portable fax machine, a portable copy machine, a portable printer, stereo headphones, a video recorder, a liquid crystal display television, a portable cleaner, a portable CD player, a mini disk, a transceiver, an electronic notebook, a calculator, a memory card, portable recorder, a radio, a backup power, a motor, a car, a motorcycle, a power bicycles, a bicycle, a lighting fixture, a toy, a game console, a clock, an electric tool, a flash lamp, a camera, a large household battery and a lithium-ion capacitor.

The technical solution of the present invention will be further described below in conjunction with the comparative examples and specific embodiments, but not limited thereto. It will be understood by those skilled in the art that the preparation methods described in the present application are merely exemplary embodiments, and any modification or equivalent of the technical solutions of the present invention without departing from the scope of the technical solutions of the present invention shall be included in the protection scope of the present invention.

PREFERRED EMBODIMENT OF THE PRESENT INVENTION

Preparation of Cathode

By using aluminum foil as a cathode current collector, a layer of lithium cobaltate slurry (positive electrode material layer) was uniformly coated on both surfaces of the cathode current collector, the lithium cobaltate slurry being composed of 90 wt % of lithium cobaltate, 1.5 wt % of polyvinylidene fluoride (PVDF) and 8.5 wt % of conductive carbon black (Super P), then the cathode current collector coated with the lithium cobaltate slurry was baked at 90° C. for 1 h, and was subjected to cutting and slitting to prepare the cathode (size 38 mm×58 mm)

Preparation of Electrolytic Solution

In an argon atmosphere environment with a water content of less than 10 ppm, lithium hexafluorophosphate and a non-aqueous organic solvent (ethylene carbonate: ethyl methyl carbonate:diethyl carbonate=30:50:20, mass ratio) were uniformly mixed according to a fixed ratio to form the electrolytic solution having a lithium salt concentration of 1.15 M.

Preparation of Lithium-Ion Battery

By using polyethylene having a thickness of 15 μm as the separator, the anode, the separator and the above-mentioned double-coated cathode of the embodiments and comparative examples were stacked and fixed in the order of FIG. 3 of the present application to form an electrode assembly. The electrode assembly was loaded in an aluminum foil packaging bag, and the electrolytic solution was injected into the electrode assembly, and subjected to vacuum encapsulation, standing, formation, shaping and the like, thereby completing the preparation of the lithium-ion batteries of the following embodiments and comparative examples.

After completing the preparation of the anode and lithium-ion battery of the following embodiments and comparative examples (i.e., fresh anode and lithium-ion battery), the thickness, width and length were recorded to determine the size of the anode and the lithium-ion battery. The anode volume change test was then performed on the fresh lithium-ion battery.

Anode Volume Change Test

The lithium-ion battery to be tested was allowed to stand in a 25±3° C. environment for 30 minutes, and charged at a constant current of 0.05 C to a voltage of 4.40 V, and then the electrochemical device was discharged at a rate of 0.05 C to 3.00 V. The fully discharged lithium-ion battery was slowly charged to a rated voltage in a constant current manner to be fully charged and the charge amount of the battery was recorded to calculate the lithium metal deposited on the anode to be tested. The lithium-ion battery in which a fixed amount of lithium metal had been deposited was then disassembled and the anode of the battery was taken out. The anode was cut to expose the cross section, and the cross section was polished by using an ion cutter (Leica, EM TIC 3X). Finally, the thickness increment of the anode structure layer in the anode was measured by an electron microscope.

Lithium metal deposition amount $(mAh/cm^2)$=full charge amount of lithium-ion battery (mAh)/single-sided area of current collector $(cm^2)$ and thickness increment of anode structure layer (%)=thickness increment of anode structure layer/total thickness of fresh anode structure layer.

Preparation of Anode

Example 1

Copper foam (first framework material) having a thickness of 100 μm was used as the first anode structure layer, wherein the copper foam had a lithium ion oxidation-reduction potential and an electronic conductivity of −45 mV and $5.96×10^7$ S/m respectively, and the first anode structure layer had a porosity of 50% to 90%, a pore size of 0.1 mm to 10 mm and a pore density of 5 ppi to 30 ppi.

A polyimide layer having a thickness of 100 μm and a porosity of 60% was prepared by an electrospinning technique, which includes the following steps: 15 wt % of polyimide powder (CP-0650, DuPont) was dissolved in an N-methylpyrrolidone (NMP) solution, and stirred at a speed of 750 rpm for 12 hours in a 60° C. oil bath to form a homogeneous solution. Then, the solution was placed in a glass syringe with a stainless steel needle and connected to a voltage source (ES30P-5 W, Gamma High Voltage Research). A voltage of 15 kV was applied to the needle to form the polyimide layer, wherein the needle was at a distance of 15 cm from the substrate, the syringe was pushed at a rate of 10 mL/min, and a reverse voltage of 1 kV was applied to the substrate to increase the uniformity of electrospinning A copper metal layer having a thickness of 10 nm was coated on the fiber surface of the polyimide layer by atomic layer deposition to form a composite material (second framework material), that is, a copper-clad polyimide layer having a thickness of 100 μm, and the copper-clad polyimide layer was used as the second anode structure layer, wherein the copper-clad polyimide layer had a lithium ion oxidation-reduction potential and an electronic conductivity of −45 mV and $4.5×10^6$ S/m respectively.

Double-sided lithium-clad copper foil was used as a current collector, wherein the copper layer in the current collector had a thickness of 12 μm and the lithium coating had a single-sided thickness of 50 μm, and the current collector was die-cut to a size of 40 mm×60 mm. Then, the first anode structure layer and the second anode structure layer were sequentially arranged and combined with the current collector by rolling, wherein a roller having a weight of 1 kg and a width of 10 cm was used and the rolling speed was 1 cm/s, thereby obtaining the anode.

Example 2

The preparation method is the same as in Example 1. The difference is that in Example 2, by using copper foam having a thickness of 100 μm as a substrate, a silver metal layer having a thickness of 1 μm was coated on the copper fiber surface by electrochemical deposition such that the surface in a three-dimensional structure was coated by silver to form a composite material (first framework material), that is, a silver-clad copper foam layer having a thickness of 100 μm, and the silver-clad copper foam layer was used as the first anode structure layer, wherein the silver-clad copper foam layer had a lithium ion oxidation-reduction potential and an electronic conductivity of 5 mV and $6.1×10^7$ S/m respectively, and the first anode structure layer had a porosity of 50% to 90%, a pore size of 0.1 mm to 10 mm and a pore density of 5 ppi to 30 ppi.

Example 3

The preparation method is the same as in Example 2. The difference is that in Example 3, a silver-clad copper foam layer having a thickness of 150 μm was used as the first anode structure layer.

Example 4

The preparation method is the same as in Example 2. The difference is that in Example 4, a copper-clad polyimide layer having a thickness of 150 μm was used as the second anode structure layer.

Example 5

The preparation method is the same as in Example 2. The difference is that in Example 5, a silver-clad copper foam layer having a thickness of 250 μm was used as the first anode structure layer.

Example 6

The preparation method is the same as in Example 2. The difference is that in Example 6, a silver-clad copper foam layer having a thickness of 400 μm was used as the first anode structure layer.

Example 7

The preparation method is the same as in Example 1. The difference is that in Example 7, by using a carbon cloth (Shanghai Hesen Electric) having a thickness of 150 μm as a substrate, a silver metal layer having a thickness of 1 μm was coated on the fiber surface by electrochemical deposition such that the surface in a three-dimensional structure was coated by silver to form a composite material (first framework material), that is, a silver-clad carbon layer having a thickness of 150 μm, and the silver-clad carbon layer was used as the anode structure layer, wherein the silver-clad carbon layer had a lithium ion oxidation-reduction potential and an electronic conductivity of 5 mV and $9 \times 10^6$ S/m respectively.

Example 8

The preparation method is the same as in Example 2. The difference is that in Example 8, copper foam (second framework material) having a thickness of 100 μm was used as the second anode structure layer.

Example 9

The preparation method is the same as in Example 7. The difference is that in Example 9, copper foam (second framework material) having a thickness of 100 μm was used as the second anode structure layer.

Example 10

The preparation method is the same as in Example 7. The difference is that in Example 10, a carbon cloth (Shanghai Hesen Electric) having a thickness of 150 μm was used as the second anode structure layer, wherein the carbon cloth had a lithium ion oxidation-reduction potential and an electronic conductivity of −20 mV and $1.3 \times 10^3$ S/m respectively.

Example 11

The preparation method is the same as in Example 2. The difference is that in Example 11, a carbon cloth (Shanghai Hesen Electric) having a thickness of 150 μm was used as the second anode structure layer, wherein the carbon cloth had a lithium ion oxidation-reduction potential and an electronic conductivity of −20 mV and $1.3 \times 10^3$ S/m respectively.

Example 12

The preparation method is the same as in Example 11. The difference is that in Example 12, a silver-clad copper foam layer having a thickness of 200 μm was used as the first anode structure layer.

Example 13

The preparation method is the same as in Example 11. The difference is that in Example 13, a silver-clad copper foam layer having a thickness of 300 μm was used as the first anode structure layer.

Comparative Example 1

A polyimide layer having a thickness of 200 μm and a porosity of 60% was prepared by an electrospinning technique, which includes the following steps: 15 wt % of polyimide powder (CP-0650, DuPont) was dissolved in an N-methylpyrrolidone (NMP) solution, and stirred at a speed of 750 rpm for 12 hours in a 60° C. oil bath to form a homogeneous solution. Then, the solution was placed in a glass syringe with a stainless steel needle and connected to a voltage source (ES30P-5 W, Gamma High Voltage Research). A voltage of 15 kV was applied to the needle to form the polyimide layer, wherein the needle was at a distance of 15 cm from the substrate, the syringe was pushed at a rate of 10 mL/min, and a reverse voltage of 1 kV was applied to the substrate to increase the uniformity of electrospinning A copper metal layer having a thickness of 10 nm was coated on the fiber surface of the polyimide layer by atomic layer deposition to form a composite material (single-layer framework material), that is, a copper-clad polyimide layer having a thickness of 200 μm, and the copper-clad polyimide layer was used as the single-layer anode structure layer.

Double-sided lithium-clad copper foil was used as a current collector, wherein the copper layer in the current collector had a thickness of 12 μm and the lithium coating had a single-sided thickness of 50 μm, and the current collector was die-cut to a size of 40 mm×60 mm. Then, the single-layer anode structure layer was combined with the current collector by rolling, wherein a roller having a weight of 1 kg and a width of 10 cm was used and the rolling speed was 1 cm/s, thereby obtaining the anode.

Comparative Example 2

The preparation method is the same as in Comparative Example 1. The difference is that in Comparative Example 2, copper foam (single-layer framework material) having a thickness of 200 μm was used as the single-layer electrode structure layer.

Comparative Example 3

The preparation method is the same as in Comparative Example 1. The difference is that in Comparative Example 3, carbon cloth (Shanghai Hesen Electric) (single-layer framework material) having a thickness of 300 μm was used as the single-layer electrode structure layer.

Comparative Example 4

The preparation method is the same as in Comparative Example 1. The difference is that in Comparative Example 4, by using copper foam having a thickness of 200 μm as a substrate, a silver metal layer having a thickness of 1 μm was coated on the copper fiber surface by electrochemical deposition such that the surface in a three-dimensional structure was coated by silver to form a composite material (single-layer framework material), that is, a silver-clad copper foam layer having a thickness of 200 μm, and the silver-clad copper foam layer was used as the single-layer anode structure layer.

Comparative Example 5

Double-sided lithium-clad copper foil was directly used as an anode, wherein the copper layer in the anode had a thickness of 12 μm and the lithium coating had a single-sided thickness of 50 μm, and the anode had a size of 40 mm×60 mm.

Comparative Example 6

The preparation method is the same as in Example 1. The difference is that in Comparative Example 6, by using copper foam having a thickness of 100 μm as a substrate, a silver metal layer having a thickness of 1 μm was coated on the copper fiber surface by electrochemical deposition such that the surface in a three-dimensional structure was coated by silver to form a composite material (second framework material), that is, a silver-clad copper foam layer having a thickness of 100 μm, and the silver-clad copper foam layer was used as the second anode structure layer.

The experimental parameters and measurement results of Examples 1-13 and Comparative Examples 1-6 described above are shown in Table 1 below.

TABLE 1

| Sample | First Anode structure Layer/Single-Layer Anode structure Layer | | | | Second Anode structure Layer | | |
|---|---|---|---|---|---|---|---|
| | First Framework Material Single-Layer Framework Material | Lithium Ion Oxidation-reduction potential (mV) | Electronic Conductivity (S/m) | Thickness (μm) | Second Framework Material | Lithium Ion Oxidation-reduction potential (mV) | Electronic Conductivity (S/m) |
| Comparative Example 1 | Copper-clad polyimide | −45 | $4.5 \times 10^6$ | 200 | N/A | N/A | N/A |
| Comparative Example 2 | Copper foam | −45 | $5.96 \times 10^7$ | 200 | N/A | N/A | N/A |
| Comparative Example 3 | Carbon cloth | −20 | $1.3 \times 10^3$ | 300 | N/A | N/A | N/A |
| Comparative Example 4 | Silver-clad copper foam | 5 | $6.1 \times 10^7$ | 200 | N/A | N/A | N/A |
| Comparative Example 5 | N/A | N/A | N/A | N/A | N/A | N/A | N/A |
| Comparative Example 6 | Copper foam | −45 | $5.96 \times 10^7$ | 100 | Silver-clad copper foam | 5 | $6.1 \times 10^7$ |
| Example 1 | Copper foam | −45 | $5.96 \times 10^7$ | 100 | Copper-clad polyimide | −45 | $4.5 \times 10^6$ |
| Example 2 | Silver-clad copper foam | 5 | $6.1 \times 10^7$ | 100 | Copper-clad polyimide | −45 | $4.5 \times 10^6$ |
| Example 3 | Silver-clad copper foam | 5 | $6.1 \times 10^7$ | 150 | Copper-clad polyimide | −45 | $4.5 \times 10^6$ |
| Example 4 | Silver-clad copper foam | 5 | $6.1 \times 10^7$ | 100 | Copper-clad polyimide | −45 | $4.5 \times 10^6$ |
| Example 5 | Silver-clad copper foam | 5 | $6.1 \times 10^7$ | 250 | Copper-clad polyimide | −45 | $4.5 \times 10^6$ |
| Example 6 | Silver-clad copper foam | 5 | $6.1 \times 10^7$ | 400 | Copper-clad polyimide | −45 | $4.5 \times 10^6$ |
| Example 7 | Silver-clad carbon cloth | 5 | $9 \times 10^6$ | 150 | Copper-clad polyimide | −45 | $4.5 \times 10^6$ |
| Example 8 | Silver-clad copper foam | 5 | $6.1 \times 10^7$ | 100 | Copper foam | −45 | $5.96 \times 10^7$ |
| Example 9 | Silver-clad carbon cloth | 5 | $9 \times 10^6$ | 150 | Copper foam | −45 | $5.96 \times 10^7$ |
| Example 10 | Silver-clad carbon cloth | 5 | $9 \times 10^6$ | 150 | Carbon cloth | −20 | $1.3 \times 10^3$ |
| Example 11 | Silver-clad copper foam | 5 | $6.1 \times 10^7$ | 100 | Carbon cloth | −20 | $1.3 \times 10^3$ |
| Example 12 | Silver-clad copper foam | 5 | $6.1 \times 10^7$ | 200 | Carbon cloth | −20 | $1.3 \times 10^3$ |
| Example 13 | Silver-clad copper foam | 5 | $6.1 \times 10^7$ | 300 | Carbon cloth | −20 | $1.3 \times 10^3$ |

| Sample | Second Anode structure Layer Thickness (μm) | Total Thickness of Anode structure Layer (μm) | Lithium Metal Deposition Amount (mAh/cm²) | Total Thickness Increment of Anode structure Layer (μm) | Thickness Increment (%) |
|---|---|---|---|---|---|
| Comparative Example 1 | N/A | 200 | 23 | 51 | 25.5% |
| Comparative Example 2 | N/A | 200 | 23 | 71 | 35.5% |
| Comparative Example 3 | N/A | 300 | 35 | 77 | 25.7% |
| Comparative Example 4 | N/A | 200 | 23 | 44 | 22.0% |
| Comparative Example 5 | N/A | 0 | 23 | 297 | N/A |
| Comparative Example 6 | 100 | 200 | 23 | 72 | 36.0% |
| Example 1 | 100 | 200 | 23 | 16 | 8.0% |
| Example 2 | 100 | 200 | 23 | 11 | 5.5% |
| Example 3 | 100 | 250 | 29 | 19 | 7.6% |

TABLE 1-continued

| | | | | | |
|---|---|---|---|---|---|
| Example 4 | 150 | 250 | 29 | 18 | 7.2% |
| Example 5 | 100 | 350 | 41 | 29 | 8.3% |
| Example 6 | 100 | 500 | 58 | 64 | 12.8% |
| Example 7 | 100 | 250 | 29 | 21 | 8.4% |
| Example 8 | 100 | 200 | 23 | 18 | 9.0% |
| Example 9 | 100 | 250 | 29 | 23 | 9.2% |
| Example 10 | 150 | 300 | 35 | 29 | 9.7% |
| Example 11 | 150 | 250 | 29 | 20 | 8.0% |
| Example 12 | 150 | 350 | 41 | 28 | 8.0% |
| Example 13 | 150 | 450 | 52 | 52 | 11.6% |

As shown in Table 1, the anodes of Examples 1-13 of the present application can effectively reduce the thickness increment of the anode to 12.8% or less of the total thickness of the anode structure layer as compared with Comparative Examples 1-6. Comparing Comparative Examples 1, 2 and 4 with Examples 1, 2 and 8, it can be seen that in the case of the same total thickness of 200 µm, the anode in the double-layer structure of the present application can effectively reduce the lithium metal deposition formed on the anode structure layer, and the total thickness increment can be greatly reduced from the range of 44 µm to 71 µm to the range of 11 µm to 18 µm. At the same time, comparing Example 3 and Example 4, it can be seen that the thickness variations of the first anode structure layer and the second anode structure layer in the thickness range of the first anode structure layer and the second anode structure layer provided by the present application can all effectively reduce the volume change rate of the anode.

In addition, comparing Comparative Example 1 with Example 1, it can be seen that when the first framework material (silver-clad copper foam layer) of the first anode structure layer (closer to the current collector) in the structure of the anode according to the embodiment of the present application has a higher electronic conductivity than the second framework material (copper foam) of the second anode structure layer, the volume change rate of the anode can be effectively reduced.

Finally, comparing Example 8 with Comparative Example 6, it can be seen that when the first framework material (silver-clad copper foam layer) of the first anode structure layer (closer to the current collector) in the structure of the anode according to the embodiment of the present application has a higher lithium ion oxidation-reduction potential than the second framework material (copper foam) of the second anode structure layer, the volume change rate of the anode can be effectively reduced. In contrast, when the first framework material (copper foam) of the first anode structure layer (closer to the current collector) has a lower lithium ion oxidation-reduction potential than the second framework material (silver-clad copper foam layer) of the second anode structure layer, the thickness increment percentage of the anode will be significantly increased from 9.0% to 36.0%.

Through the description of the above embodiments and comparative examples of the present application, it should be understood that the present application provides a novel anode, and an electrochemical device and an electronic device comprising the same. By adopting a double-layer or multilayer anode structure layer design, the space utilization ratio of the anode can be effectively enhanced, the formation of lithium dendrites may be inhibited, and the volume change amount of the anode can be reduced.

References throughout the specification of the present application to "embodiments", "partial embodiments," "an embodiment," "another example", "examples", "specific examples" or "partial examples" mean that at least one embodiment or example in the embodiments of the present application comprises specific features, structures, materials or characteristics described in the embodiment or example. Therefore, descriptions appearing throughout the specification, such as "in some embodiments", "in the embodiments", "in an embodiment", "in another example", "in an example", "in a particular example" or "examples", are not necessarily referring to the same embodiments or examples in the embodiments of the present application. Furthermore, the specific features, structures, materials or characteristics in the descriptions can be combined in any suitable manner in one or more embodiments or examples.

The above description summarizes the features of several embodiments, which enables those of ordinary skill in the art to understand the various aspects of the present application. Those of ordinary skill in the art can readily take the present application as a basis for designing or modifying other compositions to achieve the same objectives and/or the same advantages as the embodiments herein. It is also to be understood by those of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are performed in a specific order, it should be understood that these operations can be combined, subdivided, or reordered to form an equivalent method without departing from the teachings of the present application. Therefore, unless otherwise specifically indicated herein, the order and grouping of operations shall not be construed as any limitation on the present application.

What is claimed is:

1. An anode, comprising:
   a current collector;
   a first anode structure layer, the first anode structure layer comprising a first framework material;
   a second anode structure layer, the second anode structure layer comprising a second framework material, wherein the first anode structure layer is arranged between the current collector and the second anode structure layer, and the first framework material has a higher oxidation-reduction potential for lithium ion or electronic conductivity than the second framework material; and
   at least one third anode structure layer, the at least one third anode structure layer comprising a third framework material, wherein the second anode structure layer is arranged between the first anode structure layer and the at least one third anode structure layer, and the second framework material has a higher lithium ion oxidation-reduction potential or electronic conductivity than the third framework material.

2. The anode according to claim 1, wherein the first framework material has a lithium ion oxidation-reduction potential of about −50 mV to about 250 mV, and the second framework material has a lithium ion oxidation-reduction potential of about −100 mV to about 200 mV.

3. The anode according to claim 1, wherein the first framework material has an electronic conductivity of about $1 \times 10^{-2}$ S/m to about $6.30 \times 10^{7}$ S/m, and the second framework material has an electronic conductivity of about $1 \times 10^{-25}$ S/m to about $5.95 \times 10^{7}$ S/m.

4. The anode according to claim 1, comprising a plurality of third anode structure layers, wherein the third framework material comprises in any one of the plurality of third anode structure layers has a higher lithium ion oxidation-reduction potential or electronic conductivity than the third framework material comprised in the other third anode structure layers farther from the current collector.

5. The anode according to claim 1, wherein the first framework material, the second framework material and the third framework material are each independently selected from the group consisting of a high molecular polymer, a carbon-based material, a metal material, a solid electrolyte material, a composite material and combinations thereof.

6. The anode according to claim 5, wherein
the high molecular polymer is selected from the group consisting of polyethylene oxide, polyimide, polyacrylic acid, polyethylene, polypropylene, polyacrylonitrile, polystyrene, polyvinyl fluoride, polyetheretherketone, polyester, polyvinylidene chloride, polytetrafluoroethylene, polyethylene terephthalate, derivatives thereof, and combinations thereof;
the carbon-based material is selected from the group consisting of porous carbon, carbon nanotubes, carbon fibers, graphene, hollow carbon spheres and combinations thereof;
the metal material is selected from the group consisting of copper, silver, gold, nickel and alloys thereof; and
the solid electrolyte material is selected from the group consisting of lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al,Ga)_x(Ti,Ge)_{2-x}Si_yP_{3-y}O_{12}$, wherein $0 \le x \le 1$ and $0 \le y \le 1$, lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$, $0<y<2$), $SiS_2$ glass ($Li_xSi_yS_z$, wherein $0 \le x<3$, $0<y<2$, and $0<z<4$), $P_2S_5$ glass ($Li_xP_yS_z$, wherein $0 \le x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramic, garnet ceramic ($Li_{3+x}La_3M_2O_{12}$, wherein $0 \le x \le 5$, and M is Te, Nb or Zr) and combinations thereof.

7. The anode according to claim 5, wherein the composite material comprises a framework material selected from the group consisting of a high molecular polymer, a carbon-based material, a metal material, a solid electrolyte material and combinations thereof, and the inner and outer surfaces of the framework material are covered by another material selected from the group consisting of a high molecular polymer, a carbon-based material, a metal material, a solid electrolyte material, an insulating material and combinations thereof, wherein the insulating material is selected from the group consisting of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$ and combinations thereof.

8. The anode according to claim 1, wherein the first anode structure layer has a porosity of about 30% to about 98%, and the second anode structure layer has a porosity of about 30% to about 98%.

9. The anode according to claim 1, wherein the first anode structure layer and the second anode structure layer have a thickness of about 0.1 μm to about 1 mm, and the anode has a total thickness of about 0.1 μm to about 2 mm.

10. An electrochemical device, comprising:
a cathode;
a separator; and
an anode, wherein the anode comprises:
a current collector;
a first anode structure layer, the first anode structure layer comprising a first framework material;
a second anode structure layer, the second anode structure layer comprising a second framework material, wherein the first anode structure layer is arranged between the current collector and the second anode structure layer, and the first framework material has a higher oxidation-reduction potential for lithium ion or electronic conductivity than the second framework material; and
at least one third anode structure layer, the at least one third anode structure layer comprising a third framework material, wherein the second anode structure layer is arranged between the first anode structure layer and the at least one third anode structure layer, and the second framework material has a higher lithium ion oxidation-reduction potential or electronic conductivity than the third framework material.

11. The electrochemical device according to claim 10, wherein the first framework material has a lithium ion oxidation-reduction potential of about −50 mV to about 250 mV, and the second framework material has a lithium ion oxidation-reduction potential of about −100 mV to about 200 mV.

12. The electrochemical device according to claim 10, wherein the first framework material has an electronic conductivity of about $1 \times 10^{-2}$ S/m to about $6.30 \times 10^{7}$ S/m, and the second framework material has an electronic conductivity of about $1 \times 10^{-25}$ S/m to about $5.95 \times 10^{7}$ S/m.

13. The electrochemical device according to claim 10, comprising a plurality of third anode structure layers, wherein the third framework material comprises in any one of the plurality of third anode structure layers has a higher lithium ion oxidation-reduction potential or electronic conductivity than the third framework material comprised in the other third anode structure layers farther from the current collector.

14. An electronic device, comprising an electrochemical device, wherein the electrochemical device comprises:
a cathode;
a separator; and
an anode, wherein the anode comprises:
a current collector;
a first anode structure layer, the first anode structure layer comprising a first framework material;
a second anode structure layer, the second anode structure layer comprising a second framework material, wherein the first anode structure layer is arranged between the current collector and the second anode structure layer, and the first framework material has a higher oxidation-reduction potential for lithium ion or electronic conductivity than the second framework material; and at least one third anode structure layer, the at least one third anode structure layer comprising a third framework material, wherein the second anode structure layer is arranged between the first anode structure layer and the at least one third anode structure layer, and the second framework material has a higher lithium ion oxidation-reduction potential or electronic conductivity than the third framework material.

15. The electronic device according to claim 14, wherein the first framework material has a lithium ion oxidation-reduction potential of about −50 mV to about 250 mV, and the second framework material has a lithium ion oxidation-reduction potential of about −100 mV to about 200 mV.

16. The electronic device according to claim 14, wherein the first framework material has an electronic conductivity of about $1\times10^{-2}$ S/m to about $6.30\times10^{7}$ S/m, and the second framework material has an electronic conductivity of about $1\times10^{-25}$ S/m to about $5.95\times10^{7}$ S/m.

17. The electronic device according to claim 14, comprising a plurality of third anode structure layers, wherein the third framework material comprises in any one of the plurality of third anode structure layers has a higher lithium ion oxidation-reduction potential or electronic conductivity than the third framework material comprised in the other third anode structure layers farther from the current collector.

\* \* \* \* \*